(12) United States Patent
Irby, Jr.

(10) Patent No.: US 9,144,235 B1
(45) Date of Patent: Sep. 29, 2015

(54) ADJUSTABLE CLIMBING STAND SYSTEM

(71) Applicant: Lindsey J. Irby, Jr., Riverdale, GA (US)

(72) Inventor: Lindsey J. Irby, Jr., Riverdale, GA (US)

( * ) Notice: Subject to any disclaimer, the term of this patent is extended or adjusted under 35 U.S.C. 154(b) by 0 days.

(21) Appl. No.: 14/471,584

(22) Filed: Aug. 28, 2014

(51) Int. Cl.
*A01M 31/02* (2006.01)

(52) U.S. Cl.
CPC ...................... *A01M 31/02* (2013.01)

(58) Field of Classification Search
CPC .............................. A01M 31/00; A01M 31/02
USPC .......................................... 182/126, 187, 223
See application file for complete search history.

(56) References Cited

U.S. PATENT DOCUMENTS

| | | | |
|---|---|---|---|
| D270,474 S | | 9/1983 | Haines et al. |
| 4,417,645 A | * | 11/1983 | Untz ............................. 182/135 |
| 4,730,699 A | * | 3/1988 | Threlkeld ...................... 182/187 |
| 4,987,972 A | | 1/1991 | Helms |
| 5,131,496 A | | 7/1992 | White |
| 5,394,957 A | * | 3/1995 | Doby ............................ 182/187 |
| 5,482,137 A | | 1/1996 | McNeill |
| 5,641,036 A | * | 6/1997 | Maxwell ........................ 182/135 |
| 5,685,393 A | * | 11/1997 | Early ............................. 182/133 |
| 5,842,540 A | * | 12/1998 | Mancini, Jr. ................... 182/136 |
| 5,996,738 A | | 12/1999 | Nelsen |
| 6,755,466 B1 | | 6/2004 | Anders |
| 2005/0269157 A1 | * | 12/2005 | Boice et al. .................... 182/136 |
| 2007/0235259 A1 | * | 10/2007 | Tolliver et al. ................. 182/136 |
| 2007/0235261 A1 | * | 10/2007 | Forrest ........................... 182/136 |
| 2008/0156586 A1 | * | 7/2008 | Pestrue .......................... 182/136 |
| 2008/0314683 A1 | * | 12/2008 | Bedell ............................ 182/136 |
| 2009/0205905 A1 | * | 8/2009 | Amacker et al. ............... 182/20 |
| 2011/0308887 A1 | * | 12/2011 | Johnson ......................... 182/187 |
| 2012/0061180 A1 | * | 3/2012 | Phillips .......................... 182/129 |
| 2013/0341475 A1 | * | 12/2013 | Thompson ................... 248/217.4 |
| 2014/0311824 A1 | * | 10/2014 | Yoder ............................. 182/20 |

* cited by examiner

*Primary Examiner* — Charles A Fox
*Assistant Examiner* — Kristine Florio

(57) ABSTRACT

An adjustable climbing stand system with a fully rotating seat to enable a user to hunt for prey from a tree. The system comprises a primary platform (bottom) with a tree interface. The primary base platform receives a primary sliding platform. The primary sliding platform comprises a collapsible seat mount, and a seat with a rotating base. The system comprises a secondary platform (top) with a tree interface. The secondary base platform receives a secondary sliding platform. The primary platform is located on a tree trunk and the secondary platform is located on the tree trunk above the primary platform.

17 Claims, 4 Drawing Sheets

000
ADJUSTABLE CLIMBING STAND SYSTEM

BACKGROUND OF THE INVENTION

Hunting for prey has been practiced for thousands of years. Because the hunted prey is quick and elusive, mankind has searched for novel hunting aids and methods to provide an advantage for the hunter. "Tree Stands" anchored to a tree trunk are often used to position a hunter above an area to wait for prey, but often tree stands are uncomfortable for the hunter and do not allow an optimum viewpoint. The present invention addresses the need for a portable climbing stand (tree stand) that is lightweight, collapsible and has a seat that rotates 360 degrees for easy viewing.

SUMMARY

The present invention features an adjustable climbing stand system with a fully rotating seat to enable a user to hunt for prey from a tree.

In some embodiments, the system comprises a primary platform (bottom) with a "boomerang" shaped tree interface affixed to a primary first base platform side. In some embodiments, a primary third base platform side comprises a primary first open tube end and a primary second open tube end for receiving a primary sliding platform. In some embodiments, a first cinch strap first end is connected to a primary first anchor strut, routed around a tree, and then connected to a primary second anchor strut via a locking pin inserted through a pin hole.

In some embodiments, the primary sliding platform comprises a collapsible seat mount, and a seat with a rotating base. In some embodiments, the rotating base is located on the seat mount.

In some embodiments, the system comprises a secondary platform (top) with a "boomerang" shaped tree interface affixed to a secondary first base platform side. In some embodiments a secondary third base platform side comprises a secondary first open tube end and a secondary second open tube end for receiving a secondary sliding platform. In some embodiments a second cinch strap first end is connected to a secondary first anchor strut, routed around a tree, and then connected to a secondary second anchor strut via a locking pin inserted through a pin hole.

In some embodiments, the primary platform is located on a tree trunk. In some embodiments, the secondary platform is located on a tree trunk above the primary platform.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
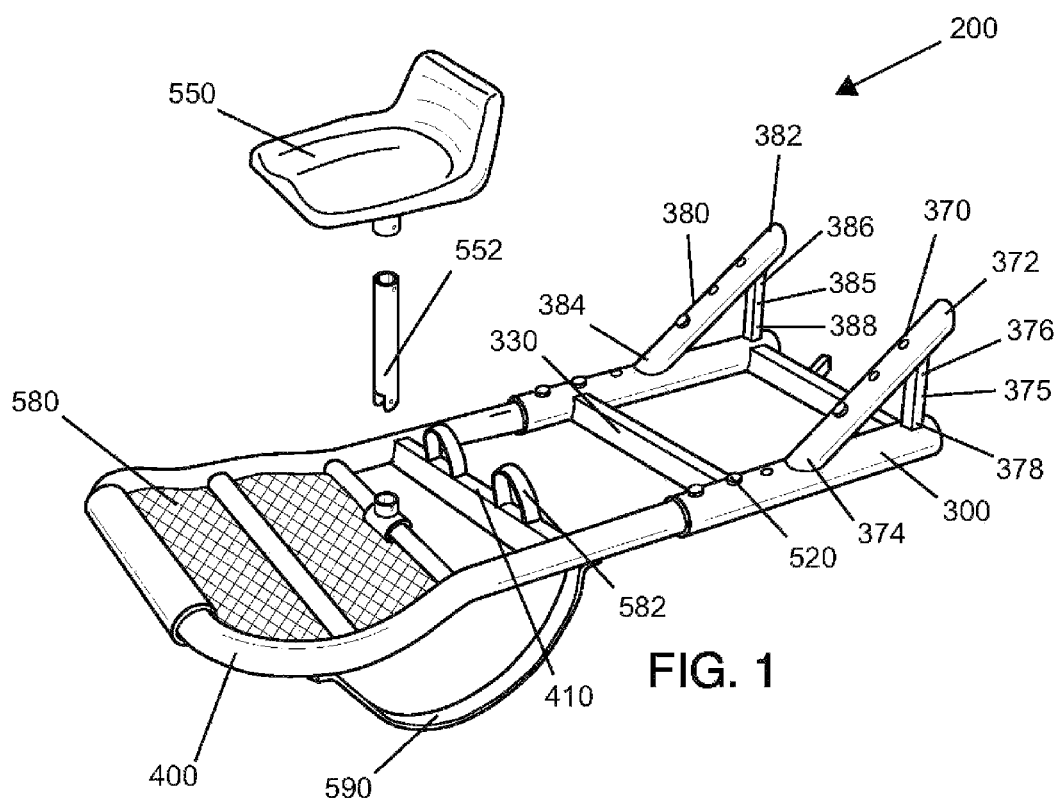
FIG. 1 is a perspective view of the primary platform of the present invention.
Figure 2:
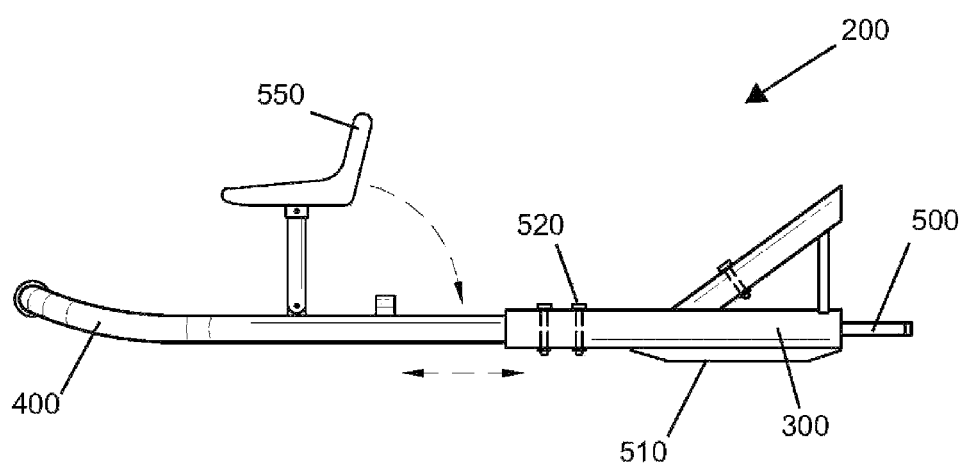
FIG. 2 is a side view of the primary platform of the present invention.
Figure 3:
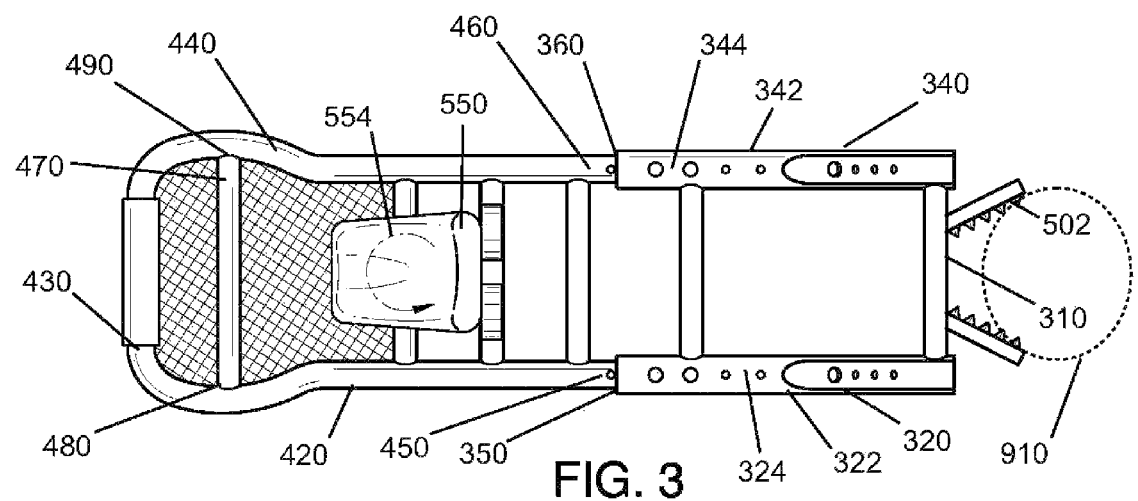
FIG. 3 is a top view of the primary platform of the present invention.
Figure 4:
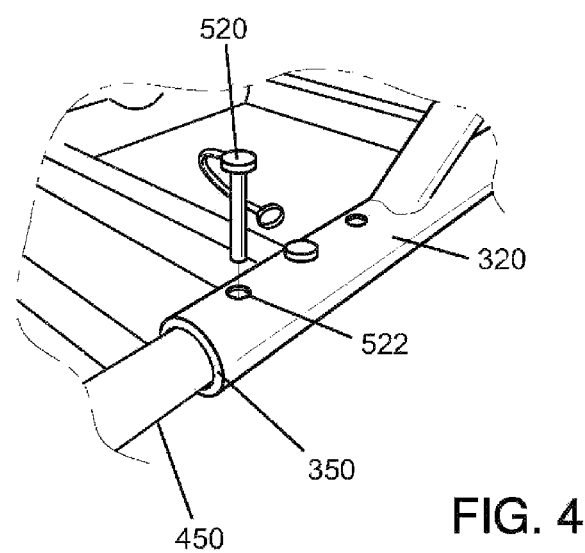
FIG. 4 is a detail view of the hardware of the present invention.
Figure 5:
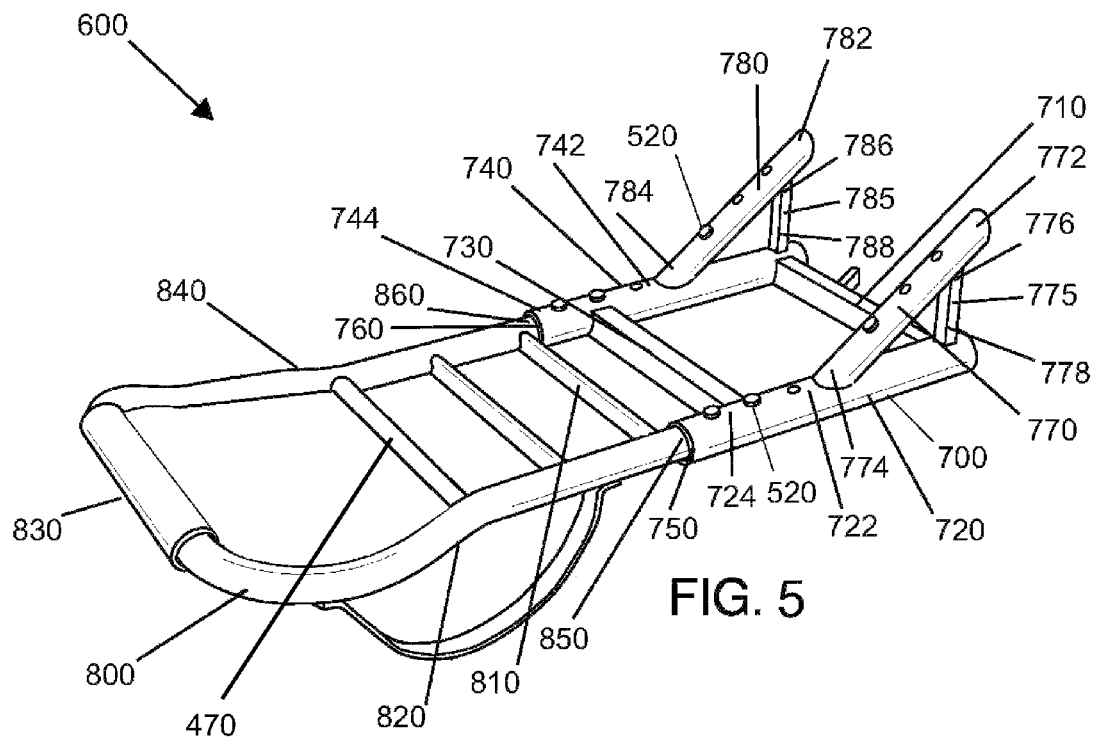
FIG. 5 is a perspective view of the secondary platform of the present invention.
Figure 6:
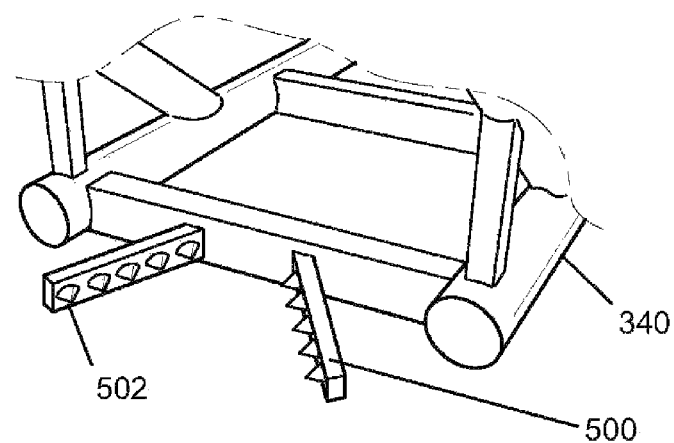
FIG. 6 is a detail view of the tree interface of the present invention.
Figure 7:
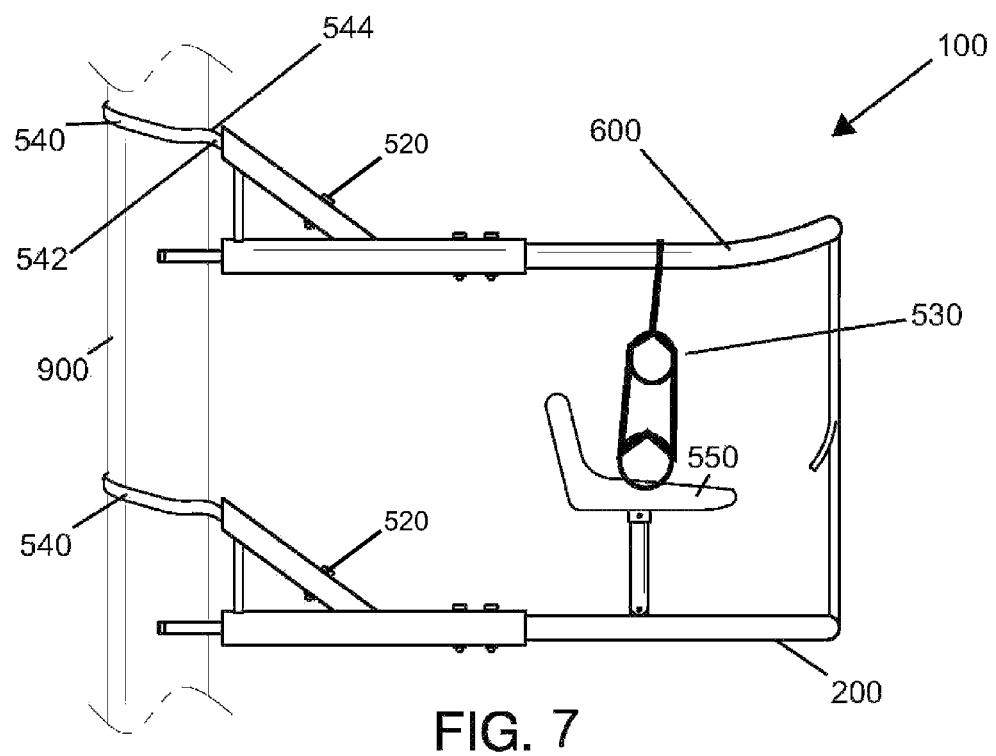
FIG. 7 is a side view of the present invention.

Following is a list of elements corresponding to a particular element referred to herein:
   100 Climbing stand system
   200 Primary platform
   300 Primary base platform
   310 Primary first base platform side
   320 Primary second base platform side
   322 Primary second base platform side middle section
   324 Primary second base top surface
   330 Primary third base platform side
   340 Primary fourth base platform side
   342 Primary fourth base platform side middle section
   344 Primary fourth base top surface
   350 Primary first open tube end
   360 Primary second open tube end
   370 Primary first anchor strut
   372 Primary first anchor strut first end
   374 Primary first anchor strut second end
   375 Primary first vertical strut support
   376 Primary first vertical strut support first end
   378 Primary first vertical strut support second end
   380 Primary second anchor strut
   382 Primary second anchor strut first end
   384 Primary second anchor strut second end
   385 Primary second vertical strut support
   386 Primary second vertical strut support first end
   388 Primary second vertical strut support second end
   400 Primary sliding platform
   410 Primary first sliding platform side
   420 Primary second sliding platform side
   430 Primary third sliding platform side
   440 Primary fourth sliding platform side
   450 Primary first sliding tube end
   460 Primary second sliding tube end
   470 Cross brace
   480 Cross brace first end
   490 Cross brace second end
   500 Tree interface
   502 Teeth
   510 Skid
   520 Locking pin
   522 Pin hole
   530 Safety harness
   540 Cinch strap
   542 Cinch strap first end
   544 Cinch strap second end
   550 Seat
   552 Seat mount
   554 Rotating base
   580 Flooring surface
   582 Stirrup
   590 Carrying strap
   600 Secondary platform
   700 Secondary base platform
   710 Secondary first base platform side
   720 Secondary second base platform side
   722 Secondary second base platform side middle section
   724 Secondary second base top surface 730 Secondary third base platform side
740 Secondary fourth base platform side
742 Secondary fourth base platform side middle section
744 Secondary fourth base top surface
750 Secondary first open tube end
760 Secondary second open tube end
770 Secondary first anchor strut
772 Secondary first anchor strut first end
774 Secondary first anchor strut second end
775 Secondary first vertical strut support
776 Secondary first vertical strut support first end
778 Secondary first vertical strut support second end
780 Secondary second anchor strut
782 Secondary second anchor strut first end
784 Secondary second anchor strut second end
785 Secondary second vertical strut support
786 Secondary second vertical strut support first end
788 Secondary second vertical strut support second end
800 Secondary sliding platform
810 Secondary first sliding platform side
820 Secondary second sliding platform side
830 Secondary third sliding platform side
840 Secondary fourth sliding platform side
850 Secondary first sliding tube end
860 Secondary second sliding tube end
900 Tree
910 Tree trunk Referring now to FIG. 1-7, the present invention features an adjustable climbing stand system (100) with a fully rotating seat (550) to enable a user to hunt for prey from a tree (900). In some embodiments, the system (100) comprises a primary platform (bottom) (200). In some embodiments the primary platform comprises a generally planar rectangular primary base platform (300). In some embodiments, the primary base platform (300) comprises a primary first base platform side (310), a primary second base platform side (320), a primary third base platform side (330), and a primary fourth base platform side (340). In some embodiments, a "boomerang" shaped tree interface (500) comprising a plurality of teeth (502) is affixed to the primary first base platform side (310).

In some embodiments, the tree interface (500) comprises straight sides. In some embodiments, the tree interface (500) comprises arc-shaped sides.

In some embodiments, the teeth (502) on the tree interface (500) are conical. In some embodiments, the teeth (502) on the tree interface (500) are pyramid-shaped. In some embodiments, the teeth (502) on the tree interface (500) are rectangular. In some embodiments the teeth (502) on the tree interface (500) are between ⅛" and ½" in length. In some embodiments, the teeth (502) on the tree interface (500) are between ½" and 1" in length. In some embodiments, the teeth (502) on the tree interface (500) are greater than 1" in length.

In some embodiments, there are between 1 and 4 teeth (502) on the tree interface (500). In some embodiments, there are between 4 and 8 teeth (502) on the tree interface (500). In some embodiments, there are between 8 and 12 teeth (502) on the tree interface (500). In some embodiments, there are more than 12 teeth (502) on the tree interface (500).

In some embodiments, the primary third base platform side (330) comprises a primary first open tube end (350) and a primary second open tube end (360) for receiving a primary sliding platform (400). In some embodiments, the primary first open tube end (350) comprises a plurality of pin holes (522) located through a cross-section thereon for receiving a first locking pin (520). In some embodiments, the primary second open tube end (360) comprises a plurality of pin holes (522) located through a cross-section thereon for receiving a second locking pin (520).

In some embodiments, a primary first anchor strut second end (374) of a primary first anchor strut (370) is located on a primary second base top surface (324) of a primary second base platform side middle section (322) and projects at an angle generally toward the primary first base platform side (310). In some embodiments, the primary first anchor strut (370) comprises a primary first vertical strut support (375) having a primary first vertical strut support first end (376) located on a primary first anchor strut first end (372) and a primary first vertical strut support second end (378) located at an intersection of the primary first base platform side (310) and the primary second base platform side (320). In some embodiments, the projection angle of the primary first anchor strut (370) is between 0 and 30 degrees. In some embodiments, the projection angle of the primary first anchor strut (370) is between 30 and 60 degrees. In some embodiments, the projection angle of the primary first anchor strut (370) is between 60 and 90 degrees.

In some embodiments, a primary second anchor strut second end (384) of a primary second anchor strut (380) is located on a primary fourth base top surface (344) of a primary fourth base platform side middle section (342) and projects at an angle generally toward the primary first base platform side (310). In some embodiments, the primary second anchor strut (380) comprises a primary second vertical strut support (385) having a primary second vertical strut support first end (386) located on a primary second anchor strut first end (382) and a primary second vertical strut support second end (388) located at an intersection of the primary first base platform side (310) and the primary fourth base platform side (340). In some embodiments, the projection angle of the primary second anchor strut (380) is between 0 and 30 degrees. In some embodiments, the projection angle of the primary second anchor strut (380) is between 30 and 60 degrees. In some embodiments, the projection angle of the primary second anchor strut (380) is between 60 and 90 degrees.

In some embodiments, a first cinch strap first end (542) is attachably connected to the primary first anchor strut (370) via a third locking pin (520) inserted through a pin hole (522) located through a cross-section of the primary first anchor strut (370). In some embodiments, a plurality of pin holes (522) is located in the primary first anchor strut (370) to provide a means for adjustment for a first cinch strap (540).

In some embodiments, the first cinch strap (540) is located around a tree (900). In some embodiments a first cinch strap second end (544) is attachably connected to the primary second anchor strut (380) via a fourth locking pin (520) inserted through a pin hole (522) located through a cross-section of the primary second anchor strut (370). In some embodiments, a plurality of pin holes (522) is located in the primary second anchor strut (370) to provide a means for adjustment of the first cinch strap (540).

In some embodiments, the primary platform (200) comprises the generally planar "U" shaped primary sliding platform (400). In some embodiments, the primary sliding platform (400) comprises a primary first sliding platform side (410), a primary second sliding platform side (420), a primary third sliding platform side (430), and a primary fourth sliding platform side (440).

In some embodiments, the primary second sliding platform side (420) comprises a primary first sliding tube end (450) that projects out and away from the primary first sliding platform side (410). In some embodiments, the primary fourth sliding platform side (440) comprises a primary second sliding tube end (460) that projects out and away from the primary first sliding platform side (410).

In some embodiments, the primary first sliding tube end (450) slidably engages the primary first open tube end (350) of the primary base platform (300) and is securely held into place via the first locking pin (520) located through a pin hole (522) located through a cross-section of the primary first sliding tube end (450) and the pin hole (522) located through the cross-section of the primary first open tube end (350). In some embodiments, the primary second sliding tube end (460) slidably engages the primary second open tube end (360) of the primary base platform (300) and is securely held into place via the second locking pin (520) located through a pin hole (522) located through a cross-section of the primary sliding tube end (460) and the pin hole (522) located through the cross-section of the primary second open tube end (360).

In some embodiments, the primary sliding platform (400) comprises a collapsible seat mount (552). In some embodiments, the seat mount (552) collapses flatly. In some embodiments, the seat mount (552) is telescopic. In some embodiments, the seat mount (552) folds.

In some embodiments, the primary sliding platform (400) comprises a generally planar flooring surface (580) located thereon. In some embodiments, the flooring surface (580) is an expanded metal. In some embodiments, the flooring surface (580) is grating. In some embodiments, the primary sliding platform (400) comprises a stirrup (582) located thereon. In some embodiments, the primary sliding platform (400) comprises a plurality of stirrups (582) located thereon. In some embodiments, the stirrups (582) are adjustable in position.

In some embodiments, the primary sliding platform (400) comprises a first carrying strap (590) located on a bottom side. In some embodiments, the primary sliding platform (400) comprises a plurality of carrying straps (590) located on a bottom side. In some embodiments, the carrying strap (590) is removable.

In some embodiments, the sliding platform comprises a first cross brace (470). In some embodiments, a first cross brace first end (480) is located on the primary second sliding platform side (420). In some embodiments, a first cross brace second end (490) is located on the primary fourth sliding platform side (440). In some embodiments, there are a plurality of cross braces (470) located on the primary sliding platform (400).

In some embodiments, the primary sliding platform (400) comprises a seat (550) having a rotating base (554). In some embodiments, the rotating base (554) is located on the seat mount (552). In some embodiments, the rotating base (554) rotates 360 degrees. In some embodiments, the seat (550) is detachable.

In some embodiments, the system (100) comprises a secondary platform (top) (600). In some embodiments, the secondary platform (600) comprises a generally planar rectangular secondary base platform (700). In some embodiments, the secondary base platform (700) comprises a secondary first base platform side (710), a secondary second base platform side (720), a secondary third base platform side (730), and a secondary fourth base platform side (740). In some embodiments, a second "boomerang" shaped tree interface (500) comprising the plurality of teeth (502) is affixed to the secondary first base platform side (710).

In some embodiments, the secondary third base platform side (730) comprises a secondary first open tube end (750) and a secondary second open tube end (760) for receiving a secondary sliding platform (800). In some embodiments, the secondary first open tube end (750) comprises a plurality of pin holes (522) located through a cross-section thereon for receiving a fifth locking pin (520). In some embodiments, the secondary second open tube end (760) comprises a plurality of pin holes (522) located through a cross-section thereon for receiving a sixth locking pin (520).

In some embodiments, a secondary first anchor strut second end (774) of a secondary first anchor strut (770) is located on a secondary second base top surface (724) of a secondary second base platform side middle section (722) and projects at an angle generally toward the secondary first base platform side (710). In some embodiments, the secondary first anchor strut (770) comprises a secondary first vertical strut support (775) having a secondary first vertical strut support first end (776) located on a secondary first anchor strut first end (772) and a secondary first vertical strut support second end (778) located at an intersection of the secondary first base platform side (710) and the secondary second base platform side (720).

In some embodiments, a secondary second anchor strut second end (784) of a secondary second anchor strut (780) is located on a secondary fourth base top (744) of a secondary fourth base platform side middle section (742) and projects at an angle generally toward the secondary first base platform side (710). In some embodiments, the secondary second anchor strut (780) comprises a secondary second vertical strut support (785) having a secondary second vertical strut support first end (786) located on a secondary second anchor strut first end (782) and a secondary second vertical strut support second end (788) located at an intersection of the secondary first base platform side (710) and the secondary fourth base platform side (740).

In some embodiments, a second cinch strap first end (542) is attachably connected to the secondary first anchor strut (770) via a seventh locking pin (520) inserted through a pin hole (522) located through a cross-section of the secondary first anchor strut (770). In some embodiments, a plurality of pin holes (522) located in the secondary first anchor strut (770) provide a means for adjustment of a second cinch strap (540).

In some embodiments, the second cinch strap (540) is located around a tree (900). In some embodiments, a second cinch strap second end (544) is attachably connected to the secondary second anchor strut (780) via an eighth locking pin (520) inserted through a pin hole (522) located through a cross-section of the secondary second anchor strut (770). In some embodiments, a plurality of pin holes (522) located in the secondary second anchor strut (770) provide a means for adjustment of the second cinch strap (540).

In some embodiments, the secondary platform comprises the generally planar "U" shaped secondary sliding platform (800). In some embodiments, the secondary sliding platform (800) comprises a secondary first sliding platform side (810), a secondary second sliding platform side (820), a secondary third sliding platform side (830), and a secondary fourth sliding platform side (840).

In some embodiments, the secondary second sliding platform side (820) comprises a secondary first sliding tube end (850) that projects out and away from the secondary first sliding platform side (810). In some embodiments, the secondary fourth sliding platform side (840) comprises a secondary second sliding tube end (860) that projects out and away from the secondary first sliding platform side (810).

In some embodiments, the secondary first sliding tube end (850) slidably engages the secondary first open tube end (750) of the secondary base platform (700) and is securely held into place via the fifth locking pin (520) located through a pin hole (522) located through a cross-section of the secondary first sliding tube end (850) and the pin hole (522) located through the cross-section of the secondary first open tube end (750). In some embodiments, a secondary second sliding tube end (860) slidably engages the secondary second open tube end (760) of the secondary base platform (700) and is securely held into place via the sixth locking pin (520) located through a pin hole (522) located through a cross-section of the secondary second sliding tube end (860) and the pin hole (522) located through the cross-section of the secondary second open tube end (760).

In some embodiments, the secondary sliding platform (800) comprises a second carrying strap (590) located on a bottom thereof.

In some embodiments, the secondary sliding platform (800) comprises a second cross brace (470), where a second cross brace first end (480) is located on the secondary second sliding platform side (820), where a second cross brace second end (490) is located on the secondary fourth sliding platform side (840).

In some embodiments, the secondary sliding platform (800) comprises an upward bend located in a middle of the secondary second sliding platform side (820). In some embodiments, the secondary sliding platform (800) comprises an upward bend located in a middle of the secondary fourth sliding platform side (840). In some embodiments, the secondary third sliding platform side is located on horizontal plane offset from the secondary first sliding platform side (810) via the upward bend on the secondary second sliding platform side (820) and the secondary fourth sliding platform side (840).

In some embodiments, the primary platform (200) is located on a tree trunk (910). In some embodiments, the secondary platform (600) is located on a tree trunk (910). In some embodiments, the secondary platform (600) is located above the primary platform.

In some embodiments, the seat (550) is constructed from a plastic. In some embodiments, the seat (550) is constructed from a blow-molded plastic. In some embodiments, the seat (550) is constructed from an injection-molded plastic. In some embodiments, the seat (550) is constructed from a composite, for example, fiberglass.

In some embodiments, the secondary platform (600) is located between 0" and 24" from the primary platform (200) on a tree trunk (910) when in use. In some embodiments, the secondary platform (600) is located between 24" and 48" from the primary platform (200) on a tree trunk (910) when in use. In some embodiments, the secondary platform (600) is located between 48" and 72" from the primary platform (200) on a tree trunk (910) when in use. In some embodiments, the secondary platform (600) is located between 72" and 96" from the primary platform (200) on a tree trunk (910) when in use. In some embodiments, the secondary platform (600) is located more than 96" from the primary platform (200) on a tree trunk (910) when in use.

In some embodiments, the system (100) is generally constructed from a composite material. In some embodiments, the system (100) is generally constructed from a metal. In some embodiments, the system (100) is generally constructed from aluminum.

In some embodiments, the primary platform (200) comprises a padding member located thereon. In some embodiments, the secondary platform (600) comprises a padding member located thereon.

In some embodiments, the system (100) comprises a corrosion resistant coating located thereon.

In some embodiments, the system (100) comprises a skid (920) located thereon for sliding the system (100) on a ground surface during transport. In some embodiments, the system (100) can be further used to transport prey by sliding the system (100) on the ground surface during transport.

In some embodiments, the system (100) comprises a safety harness (530) located on the primary platform (200). In some embodiments, the system (100) comprises a safety harness (530) located on the secondary platform (600).

In some embodiments, the primary platform (200) is located on a tree trunk (910). In some embodiments, the secondary platform (600) is located on a tree trunk (910). In some embodiments, the secondary platform (600) is located above the primary platform (200). In some embodiments, the primary platform (200) is attachably connected to the secondary platform (600).

In some embodiments, for transport, the primary platform (200) is attachably connected to the secondary platform (600).

In some embodiments, the system (100) comprises wheels for transport.

In some embodiments, the primary platform (200) and the secondary platform (600) are generally alike in size, shape and construction.

As used herein, the term "about" refers to plus or minus 10% of the referenced number. For example, an embodiment wherein the platform is about 10 inches in length includes a platform that is between 9 and 11 inches in length.

The disclosures of the following U.S. patents are incorporated in their entirety by reference herein: U.S. Design Pat. No. 270,474; U.S. Pat. No. 6,755,466; U.S. Pat. No. 5,996,738; U.S. Pat. No. 5,482,137; U.S. Pat. No. 5,131,496; U.S. Pat. No. 4,987,972.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. An adjustable climbing stand system (100) with a fully rotating seat (550) to enable a user to hunt for prey from a tree (900) comprising:
   (a) a primary platform (200) comprising:
     (i) a generally planar rectangular primary base platform (300) comprising a primary first base platform side (310), a primary second base platform side (320), a primary third base platform side (330), and a primary fourth base platform side (340), wherein a "boomerang" shaped tree interface (500) comprising a plurality of teeth (502) is affixed to the primary first base platform side (310), wherein the primary third base platform side (330) comprises a primary first open tube end (350) and a primary second open tube end (360) for receiving a generally planar "U" shaped primary sliding platform (400), wherein the primary first open tube end (350) comprises a plurality of pin holes (522) disposed through a cross-section thereon for receiving a first locking pin (520), wherein the primary second open tube end (360) comprises a plurality of pin holes (522) disposed through a cross-section thereon for receiving a second locking pin (520), wherein a primary first anchor strut second end (374) of a primary first anchor strut (370) is disposed on a primary second base top surface (324) of a primary second base platform side middle section (322) and projects at an angle generally toward the primary first base platform side (310), wherein the primary first anchor strut (370) comprises a primary first vertical strut support (375) having a primary first vertical strut support first end (376) disposed on a primary first anchor strut first end (372) and a primary first vertical strut support second end (378) disposed at an intersection of the primary first base platform side (310) and the primary second base platform side (320), wherein a primary second anchor strut second end (384) of a primary second anchor strut (380) is disposed on a primary fourth base top surface (344) of a primary fourth base platform side middle section (342) and projects at an angle generally toward the primary first base platform side (310), wherein the primary second anchor strut (380) comprises a primary second vertical strut support (385) having a primary second vertical strut support first end (386) disposed on a primary second anchor strut first end (382) and a primary second vertical strut support second end (388) disposed at an intersection of the primary first base platform side (310) and the primary fourth base platform side (340), wherein a first cinch strap first end (542) is disposed within the primary first anchor strut (370) and is attachably connected to the primary first anchor strut (370) via a third locking pin (520) inserted through a pin hole (522) disposed through a cross-section of the primary first anchor strut (370), wherein a plurality of pin holes (522) is disposed in the primary first anchor strut (370) to provide a means for adjustment for a first cinch strap (540), wherein the first cinch strap (540) is disposed around a tree (900), wherein a first cinch strap second end (544) is disposed within the primary second anchor strut (380) and is attachably connected to the primary second anchor strut (380) via a fourth locking pin (520) inserted through a pin hole (522) disposed through a cross-section of the primary second anchor strut (380), wherein a plurality of pin holes (522) is disposed in the primary second anchor strut (380) to provide a means for adjustment of the first cinch strap (540), (ii) the generally planar "U" shaped primary sliding platform (400) comprising a primary first sliding platform side (410), a primary second sliding platform side (420), a primary third sliding platform side (430), and a primary fourth sliding platform side (440), wherein the primary second sliding platform side (420) comprises a primary first sliding tube end (450) that projects out and away from the primary first sliding platform side (410), wherein the primary fourth sliding platform side (440) comprises a primary second sliding tube end (460) that projects out and away from the primary first sliding platform side (410), wherein the primary first sliding tube end (450) slidably engages the primary first open tube end (350) of the primary base platform (300) and is securely held into place via the first locking pin (520) disposed through a pin hole (522) disposed through a cross-section of the primary first sliding tube end (450) and the pin hole (522) disposed through the cross-section of the primary first open tube end (350), wherein a primary second sliding tube end (460) slidably engages the primary second open tube end (360) of the primary base platform (300) and is securely held into place via the second locking pin (520) disposed through a pin hole (522) disposed through a cross-section of the primary sliding tube end (460) and the pin hole (522) disposed through the cross-section of the primary second open tube end (360), wherein the primary sliding platform (400) comprises a collapsible seat mount (552), wherein the primary sliding platform (400) comprises a generally planar flooring surface (580) disposed thereon, wherein the primary sliding platform (400) comprises a stirrup (582) disposed thereon, wherein the primary sliding platform (400) comprises a first carrying strap (590) disposed on a bottom thereof, wherein the sliding platform comprises a first cross brace (470), wherein a first cross brace first end (480) is disposed on the primary second sliding platform side (420), wherein a first cross brace second end (490) is disposed on the primary fourth sliding platform side (440), wherein the primary sliding platform (400) comprises the seat (550) having a rotating base (554), wherein the rotating base (554) is disposed on the seat mount (552), wherein the rotating base (554) rotates 360 degrees;

(b) a secondary platform (600) comprising:

(i) a generally planar rectangular secondary base platform (700) comprising a secondary first base platform side (710), a secondary second base platform side (720), a secondary third base platform side (730), and a secondary fourth base platform side (740), wherein a second "boomerang" shaped tree interface (500) comprising a second plurality of teeth (502) is affixed to the secondary first base platform side (710), wherein the secondary third base platform side (730) comprises a secondary first open tube end (750) and a secondary second open tube end (760) for receiving a generally planar "U" shaped secondary sliding platform (800), wherein the secondary first open tube end (750) comprises a plurality of pin holes (522) disposed through a cross-section thereon for receiving a fifth locking pin (520), wherein the secondary second open tube end (760) comprises a plurality of pin holes (522) disposed through a cross-section thereon for receiving a sixth locking pin (520), wherein a secondary first anchor strut second end (774) of a secondary first anchor strut (770) is disposed on a secondary second base top surface (724) of a secondary second base platform side middle section (722) and projects at an angle generally toward the secondary first base platform side (710), wherein the secondary first anchor strut (770) comprises a secondary first vertical strut support (775) having a secondary first vertical strut support first end (776) disposed on a secondary first anchor strut first end (772) and a secondary first vertical strut support second end (778) disposed at an intersection of the secondary first base platform side (710) and the secondary second base platform side (720), wherein a secondary second anchor strut second end (784) of a secondary second anchor strut (780) is disposed on a secondary fourth base top surface (744) of a secondary fourth base platform side middle section (742) and projects at an angle generally toward the secondary first base platform side (710), wherein the secondary second anchor strut (780) comprises a secondary second vertical strut support (785) having a secondary second vertical strut support first end (786) disposed on a secondary second anchor strut first end (782) and a secondary second vertical strut support second end (788) disposed at an intersection of the secondary first base platform side (710) and the secondary fourth base platform side (740), wherein a second cinch strap first end (542) is disposed within the secondary first anchor strut (770) and is attachably connected to the secondary first anchor strut (770) via a seventh locking pin (520) inserted through a pin hole (522) disposed through a cross-section of the secondary first anchor strut (770), wherein a plurality of pin holes (522) disposed in the secondary first anchor strut (770) provide a means for adjustment of a second cinch strap (540), wherein the second cinch strap (540) is disposed around a tree (900), wherein a second cinch strap second end (544) is disposed within the secondary second anchor strut (780) and is attachably connected to the secondary second anchor strut (780) via an eighth locking pin (520) inserted through a pin hole (522) disposed through a cross-section of the secondary second anchor strut (780), wherein a plurality of pin holes (522) disposed in the secondary second anchor strut (780) provide a means for adjustment of the second cinch strap (540), (ii) the generally planar "U" shaped secondary sliding platform (800) comprising a secondary first sliding platform side (810), a secondary second sliding platform side (820), a secondary third sliding platform side (830), and a secondary fourth sliding platform side (840), wherein the secondary second sliding platform side (820) comprises a secondary first sliding tube end (850) that projects out and away from the secondary first sliding platform side (810), wherein the secondary fourth sliding platform side (840) comprises a secondary second sliding tube end (860) that projects out and away from the secondary first sliding platform side (810), wherein the secondary first sliding tube end (850) slidably engages the secondary first open tube end (750) of the secondary base platform (700) and is securely held into place via the fifth locking pin (520) disposed through a pin hole (522) disposed through a cross-section of the secondary first sliding tube end (850) and the pin hole (522) disposed through the cross-section of the secondary first open tube end (750), wherein a secondary second sliding tube end (860) slidably engages the secondary second open tube end (760) of the secondary base platform (700) and is securely held into place via the sixth locking pin (520) disposed through a pin hole (522) disposed through a cross-section of the secondary second sliding tube end (860) and the pin hole (522) disposed through the cross-section of the secondary second open tube end (760), wherein the secondary sliding platform (800) comprises a second carrying strap (590) disposed on a bottom thereof, wherein the secondary sliding platform (800) comprises a second cross brace (470), wherein a second cross brace first end (480) is disposed on the secondary second sliding platform side (820), wherein a second cross brace second end (490) is disposed on the secondary fourth sliding platform side (840), wherein the secondary sliding platform (800) comprises an upward bend disposed in a middle of the secondary second sliding platform side (820), wherein the secondary sliding platform (800) comprises an upward bend disposed in a middle of the secondary fourth sliding platform side (840), wherein the secondary third sliding platform side is disposed on horizontal plane offset from the secondary first sliding platform side (810) via the upward bend on the secondary second sliding platform side (820) and the secondary fourth sliding platform side (840);

wherein the primary platform (200) is disposed on a tree trunk (910), wherein the secondary platform (600) is disposed on a tree trunk (910), wherein the secondary platform (600) is disposed above the primary platform.

2. The system (100) of claim 1, wherein the seat (550) is constructed from a plastic.

3. The system (100) of claim 1, wherein the secondary platform (600) is disposed between 0" and 24" from the primary platform (200) on a tree trunk (910) when in use.

4. The system (100) of claim 1, wherein the secondary platform (600) is disposed between 24" and 48" from the primary platform (200) on a tree trunk (910) when in use.

5. The system (100) of claim 1, wherein the secondary platform (600) is disposed between 48" and 72" from the primary platform (200) on a tree trunk (910) when in use.

6. The system (100) of claim 1, wherein the secondary platform (600) is disposed between 72" and 96" from the primary platform (200) on a tree trunk (910) when in use.

7. The system (100) of claim 1, wherein the secondary platform (600) is disposed more than 96" from the primary platform (200) on a tree trunk (910) when in use.

8. The system (100) of claim 1, wherein the system (100) is generally constructed from a composite material.

9. The system (100) of claim 1, wherein the system (100) is generally constructed from a metal.

10. The system (100) of claim 1, wherein the primary platform (200) comprises a padding member disposed thereon.

11. The system (100) of claim 1, wherein the secondary platform (600) comprises a padding member disposed thereon.

12. The system (100) of claim 1, wherein the system (100) comprises a corrosion resistant coating disposed thereon.

13. The system (100) of claim 1, wherein the system (100) comprises a skid (920) disposed thereon for sliding the system (100) on a ground surface during transport, wherein the system (100) can be further used to transport prey by sliding the system (100) on the ground surface during transport.

14. The system (100) of claim 1, wherein the system (100) comprises a safety harness (530) disposed on the primary platform (200).

15. The system (100) of claim 1, wherein the system (100) comprises a safety harness (530) disposed on the secondary platform (600).

16. The system (100) of claim 1, wherein the primary platform (200) is disposed on a tree trunk (910), wherein the secondary platform (600) is disposed on a tree trunk (910), wherein the secondary platform (600) is disposed above the primary platform (200), wherein the primary platform (200) is attachably connected to the secondary platform (600).

17. The system (100) of claim 1, wherein for transport, the primary platform (200) is attachably connected to the secondary platform (600).

* * * * *